United States Patent [19]

Sasaki et al.

[11] Patent Number: 5,107,889
[45] Date of Patent: Apr. 28, 1992

[54] TURN RESERVOIR FOR USE IN AUTOMOTIVE FUEL TANK

[75] Inventors: Michiaki Sasaki; Junya Ohno; Katsunori Ozaki, all of Kanagawa, Japan

[73] Assignees: Nissan Motor Company Ltd.; Nifco Inc., both of Yokohama, Japan

[21] Appl. No.: 646,900

[22] Filed: Jan. 28, 1991

[30] Foreign Application Priority Data

Jan. 30, 1990 [JP] Japan .................. 2-17895
Jan. 30, 1990 [JP] Japan .................. 2-17896

[51] Int. Cl.⁵ .......................................... F02M 37/00
[52] U.S. Cl. .................... 137/574; 137/576; 123/514
[58] Field of Search ............ 137/574, 576, 587, 571; 123/514, 516

[56] References Cited

U.S. PATENT DOCUMENTS

| | | | |
|---|---|---|---|
| 4,397,333 | 8/1983 | Liba et al. | 137/574 |
| 4,503,885 | 3/1985 | Hall | 137/574 |
| 4,546,750 | 10/1985 | Brunell et al. | 123/514 |
| 4,657,156 | 4/1987 | Uranishi et al. | 137/587 x |
| 4,750,518 | 6/1988 | Griffin et al. | 137/574 X |
| 4,878,518 | 11/1989 | Tuckey | 137/576 X |
| 4,899,784 | 2/1990 | Woodgate et al. | 137/574 |
| 5,016,670 | 3/1991 | Sasaki et al. | 137/574 |

FOREIGN PATENT DOCUMENTS

| | | |
|---|---|---|
| 20296350 | 12/1988 | European Pat. Off. . |
| 20314068 | 5/1989 | European Pat. Off. . |
| 56-138718 | 3/1980 | Japan . |
| 61-57034 | 4/1986 | Japan . |
| 61-59432 | 4/1986 | Japan . |

Primary Examiner—John Rivell
Attorney, Agent, or Firm—Pennie & Edmonds

[57] ABSTRACT

A reservoir arrangement for use in an automotive fuel tank includes a reservoir body in which fuel is guided and from which fuel is pumped. The reservoir body defines a fuel passage by upwardly depressing its bottom surface and fittingly engaged the depressed surface with a chamber plate. The chamber plate is made of a material whose swelling amount by fuel is larger than that of the reservoir body, thereby causing a tight fit of the chamber plate.

11 Claims, 9 Drawing Sheets

TURN RESERVOIR FOR USE IN AUTOMOTIVE FUEL TANK

BACKGROUND OF THE INVENTION

1. Field of the Invention

The present invention relates to improvements in a turn reservoir which is used in an automotive fuel tank, and more particularly improvements in an induction passage of the turn reservoir.

2. Description of the Prior Art

It is well known that a reservoir in an automotive fuel tank is designed to store a enough fuel so that the fuel supply is not interrupted even if the fuel is biased on to one side of the tank by a centrifugal force caused by turning of the automotive vehicle or the like. Such a reservoir is disclosed, for example, in Japanese Utility Model Provisional Publication No. 61-57034.

As shown in FIGS. 17 and 18, the reservoir 211 is welded on a bottom wall of the fuel tank 201 and equipped with a reservoir body 213 which is formed in a box-shape so as to store fuel therein. The reservoir body 213 further includes a fuel passage 221 formed of L-shaped to extend along the outside surfaces of side walls 215, 217. An outside wall 223 of the fuel passage 221 is formed so that its upper edge 223a is downwardly inclined and extends toward the bottom wall 203. The side wall 215 of the reservoir body 213 is formed so that its upper edge 215a is downwardly inclined and extends toward the side wall 219. An outlet 225 is defined by a lower portion of the upper edge 215a of the side wall 215 and an inner surface of the side wall 219. A suction pipe 227 of a fuel pump (not shown) is disposed in the reservoir body 213.

Furthermore, returning fuel from the engine is guided into the reservoir body 213 through a return pipe 229 as disclosed in Japanese Utility Model Provisional Publication No. 61-59432. With this arrangement, even if the fuel is biased by a centrifugal force caused by turning of the automotive vehicle, the reservoir 211 can hold enough fuel, such amount as indicated by line A or B of FIG. 18.

Accordingly, in order to stably supply fuel into the engine, it is necessary that the reservoir body 213 is formed to have a predetermined volume. However, since the reservoir 211 is usually assembled into the fuel tank 201 through an operation window of the fuel tank 201, the reservoir 211 has to be made small in size so as to be passable through the operation window.

When the inlet 221a and the outlet 225 of the fuel passage 221 are formed so that their lower portions are higher than the bottom wall of the fuel tank as shown in FIG. 18, the reservoir 211 can store fuel while being passable through the operating window.

However, when the fuel in the fuel tank 201 is decreased as its level is lower than the lower portions of the inlet and outlet 221a, 225, the fuel in the fuel tank 201 cannot be guided into the reservoir 211.

SUMMARY OF THE INVENTION

It is an object of the present invention to provide an improved reservoir arrangement with which fuel in a fuel tank is transferred to the reservoir even if the remaining amount of fuel in the tank is small.

Another object of the present invention is to provide an improved reservoir arrangement in which a fuel passage is formed to guide fuel into a reservoir body.

A further object of the present invention is to provide an improved reservoir arrangement which includes a leakless fuel passage formed without using adhesive or improving an accuracy of parts.

A reservoir arrangement for use in an automotive fuel tank, according to the present invention, is connected to an inside bottom surface of the fuel tank. The reservoir arrangement comprises a reservoir body defining a fuel reservoir in which fuel is collected and from which the fuel is pumped. The reservoir body has an outer bottom surface which includes a depressed surface depressed in a direction far from the fuel tank bottom surface. A chamber plate is engaged with the depressed surface to define a fuel passage through which fuel flows to be collected in the fuel reservoir and located between the depressed surface and the fuel tank bottom surface. The chamber plate is made of a material whose amount of swelling by fuel is larger than that of the reservoir body.

With this arrangement, by virtue of swelling of the chamber plate, the chamber plate is sealingly engaged with the depressed surface of the reservoir body and defines the sealable fuel passage.

BRIEF DESCRIPTION OF THE INVENTION

In the drawings, the same numerals designate the same elements and parts throughout all the figures, in which.

DETAILED DESCRIPTION OF THE INVENTION

Figure 1:
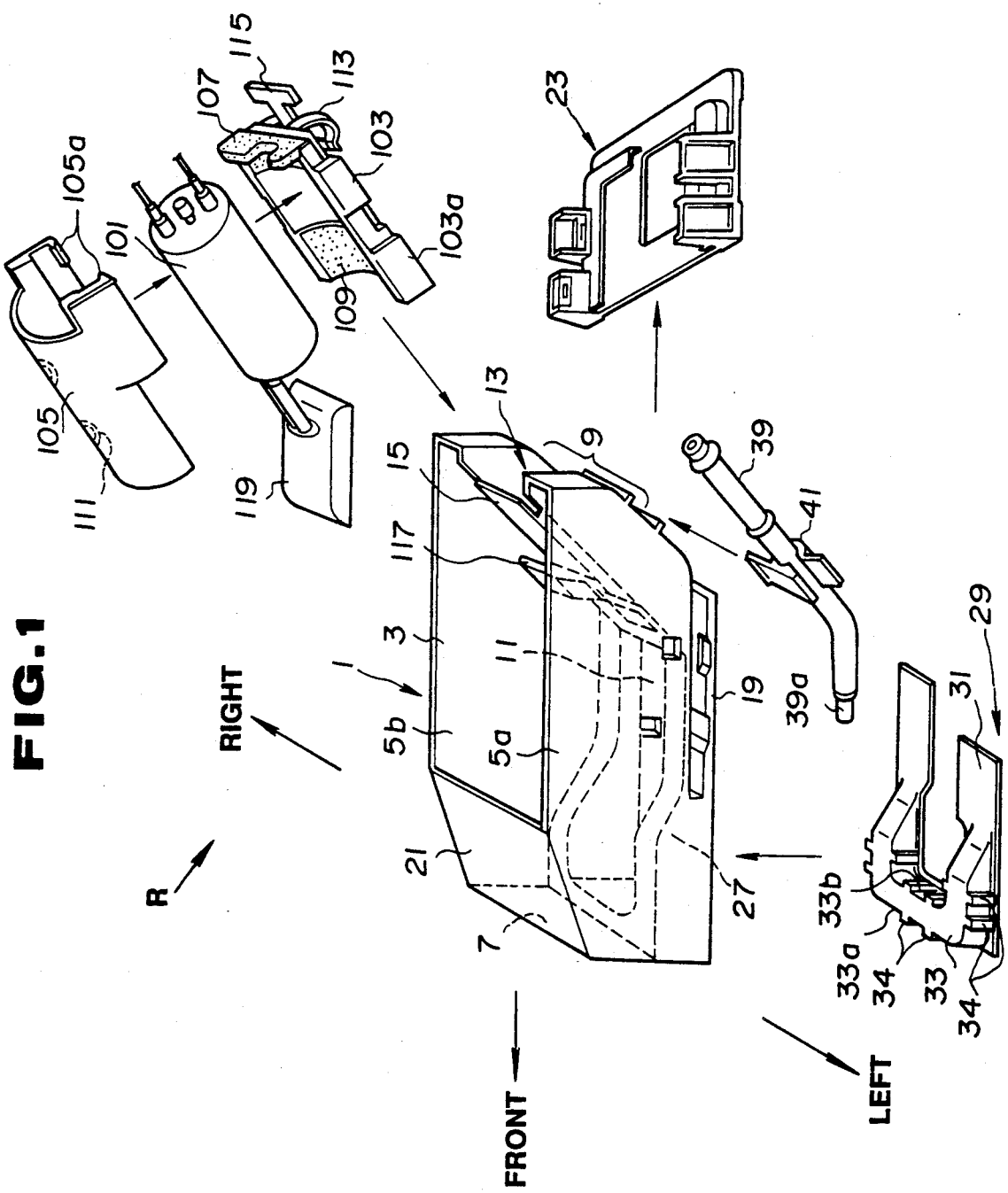
FIG. 1 is an exploded perspective view of a first embodiment of a reservoir arrangement according to the present invention.
Figure 2:
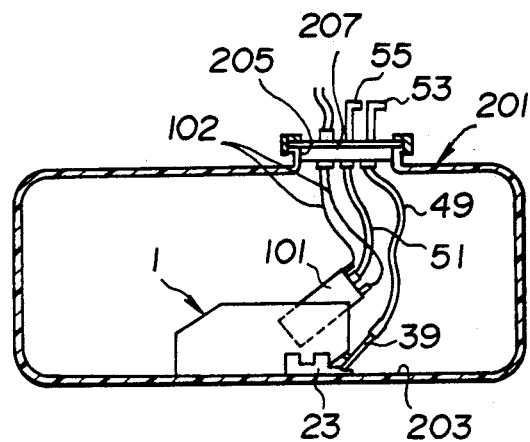
FIG. 2 is a side sectional view of a fuel tank provided with the reservoir arrangement of FIG. 1.

Referring now to FIGS. 1 to 7, a first embodiment of a reservoir arrangement for use in an automotive fuel tank 201 according to the present invention is illustrated by reference character R. The reservoir arrangement R is for use in the automotive fuel tank 201 and comprises a turn reservoir 1 connected to a bottom wall 203 of the fuel tank 201. The turn reservoir 1 is made of fiber reinforced plastic such as glass fiber reinforced nylon. In this case, the nylon is preferably nylon-6,6. The turn reservoir 1 includes a reservoir body 3 formed with right and left side walls 5a, 5b, a front wall 7 and a rear wall 9. The reservoir body 3 defines a fuel reserving space therein. The reservoir body 3 has a slender shape so as to be inserted through an operating window 205 into a fuel tank 201. The rear wall 9 is inclined in the forward direction except for its upper portion and has a recess 13 extending generally in the vertical direction. An installation plate 15 defining the recess 13 is inclined in the generally same direction with the rear wall 9 and connected to a bottom wall 11 of the reservoir body 3. A fuel pump 101 of an electromagnetically operated type is installed on the installation plate 15 so as to be disposed in the turn reservoir 1. The reservoir body 3 is provided with a flange 19 which extends from a middle portion of the bottom wall 11 to a lower end portion of the rear wall 9. A cover member 21 is installed on the front wall 7 so as to be formed inwardly inclined. The cover member 21 prevents the fuel in the turn reservoir 1 from overflowing when a vehicle (not shown) suddenly turns or stops.

Figure 12:
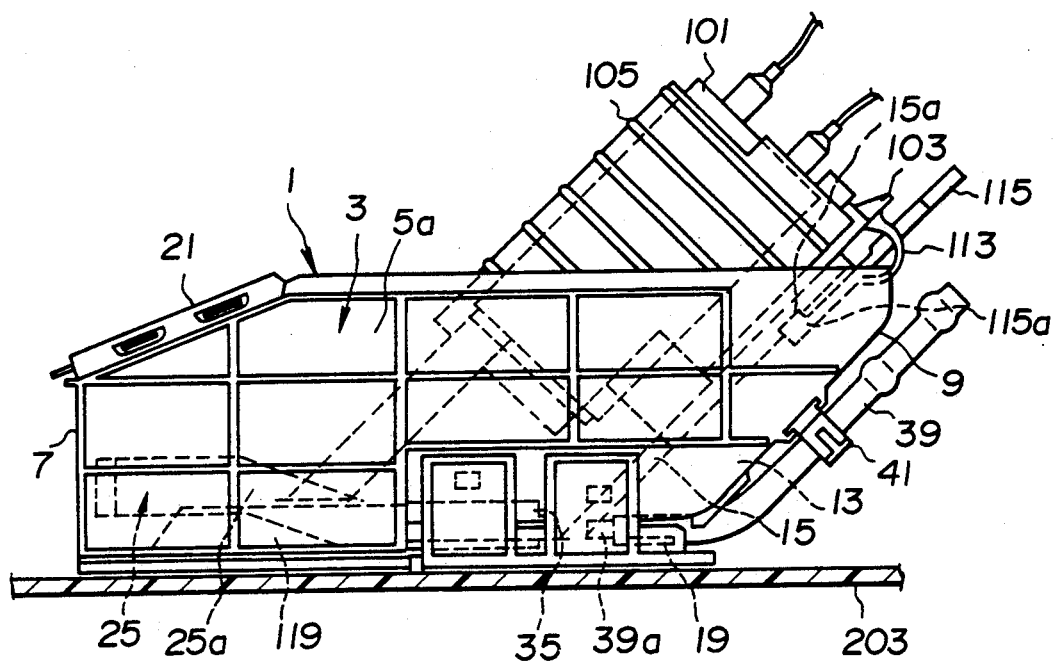
FIG. 12 is a side view of the reservoir arrangement of FIG. 11.
Figure 13:
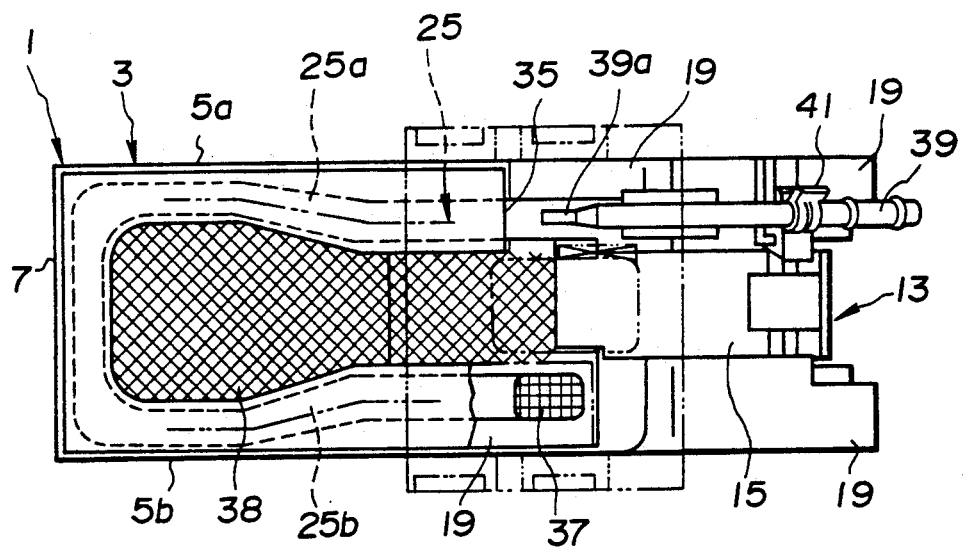
FIG. 13 is a bottom plan view, partly in section, of the reservoir arrangement of FIG. 12.
Figure 14:
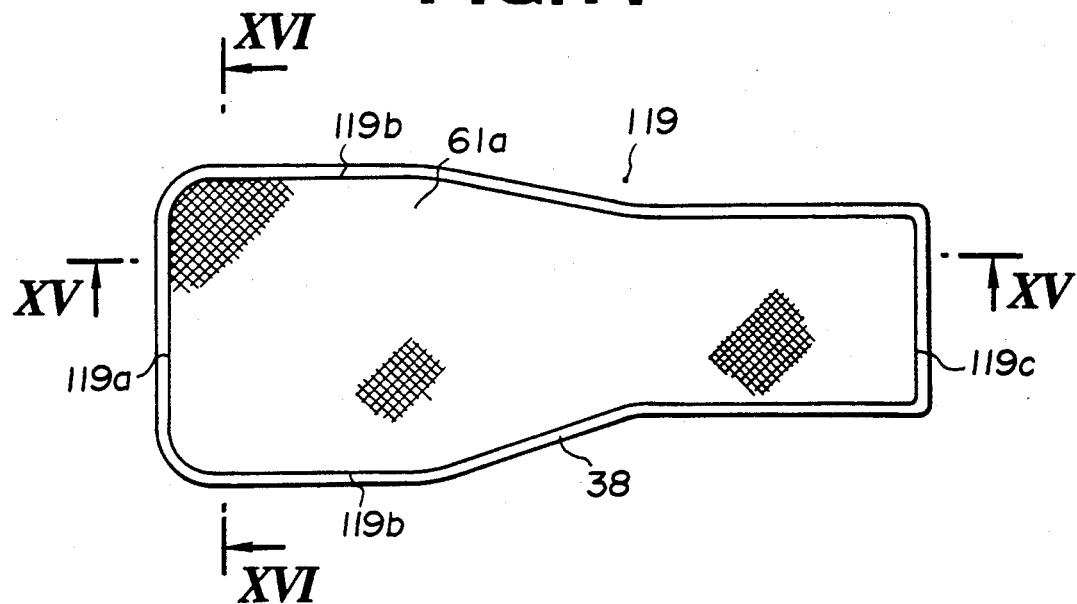
FIG. 14 is a plan view of a strainer installed to the reservoir arrangement of FIG. 11.

The fuel pump 101 is clamped through cushion rubbers 107, 109, 111 between a base 103 and a cover 105 connected to the base 102. The base 103 and the cover 105 are made of a resilient plastic such as nylon. The fuel pump 101 clamped by the base 103 and the cover 105 is installed to the installation plate 15. A latch lever 115 extending along the base 103 is integrally formed through a pair of C-shaped plate springs with the base 103. When the base 103 is slid down along a front surface of the installation plate 15 to the bottom wall 11, the lower end portion 103a of the base 103 is stopped by a projection 117 which is formed on a lower end portion of the installation plate 15. Simultaneously the base 103 is fixed in a manner such that a clip 115a, as shown in FIG. 12 of the latch lever 115 is inserted into a latch groove (not shown) formed in the installation plate 15. A strainer 119 is disposed at a sucking portion of the fuel pump 101. A bottom surface of the strainer 119 is disposed in contact with or in the vicinity of the bottom wall 11 of the tank body 201. The turn reservoir 1 is installed to a bracket 23 welded to the bottom wall 203 of the fuel tank 201 through the flange 19.

A fuel passage 25 of the turn reservoir 1 is formed in a tunnel shape. A passage surface 27 is formed with an upper surface and both side surfaces defining the fuel passage 25. The passage surface 27 is formed by upwardly depressing the bottom wall 11 of the reservoir body 3 so as to be of a generally U-shape. A bottom surface which defines the fuel passage 25 is formed with a chamber plate 29 engaged with the bottom wall 11.

An installation portion 27a, with which the chamber plate 29 is engaged, is formed at a lower end of the passage surface 27 as shown in FIGS. 3 to 7. An opening 27b is formed at a rear end portion of the passage surface 27 to be opened in the left rear direction of the reservoir body 3 of FIG. 1, and is communicated with the recess 13 of the reservoir body 3.

The chamber plate 29 is made of a material whose amount of swelling by fuel (gasoline) is larger than that of the turn reservoir 1. Preferably, the material is nylon-12. The chamber plate 29 is provided with a plate portion 31 formed generally U-shape as shown in FIG. 1 and FIGS. 3 to 6. An engaging portion 33 of the chamber plate 29 is formed at a front side of the plate portion 31 so as to be engaged with the reservoir body 3. A plurality of protruding ribs 34 are disposed on both side walls 33a of the engaging portion 33 with adequate intervals. The protruding ribs 34 are integral at their lower ends with the plate portion 31 and formed to have the same height level as an upper surface of the engaging portion 33. The engaging portion 33 of the chamber plate 29 is engaged with the passage surface 27 through the protruding ribs 34. The plate portion 31 is engaged with the installation portion 27a forming a lower end of the passage surface 27.

Figure 3:
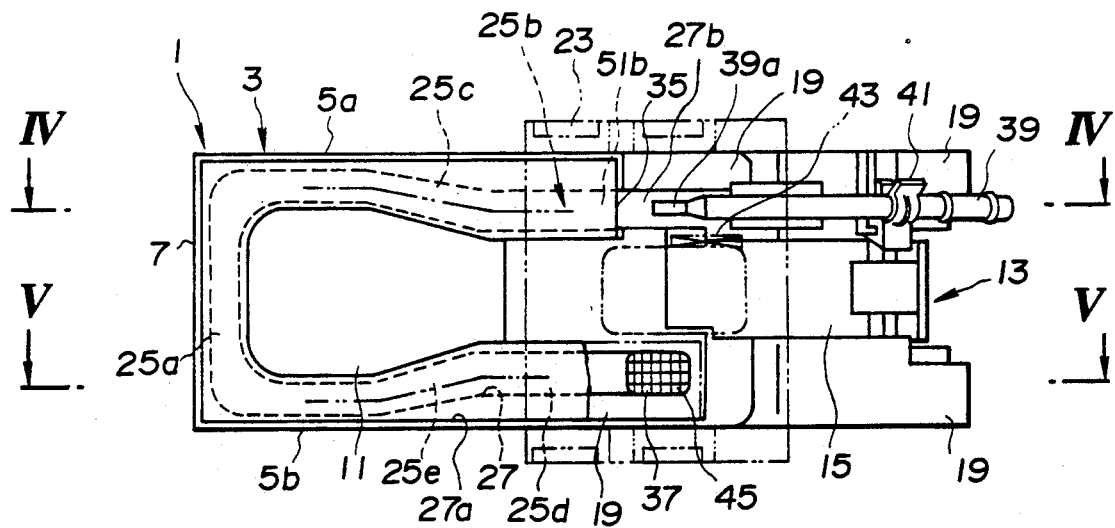
FIG. 3 is a bottom plan view, partly in section, of the reservoir arrangement of FIG. 2.
Figure 4:
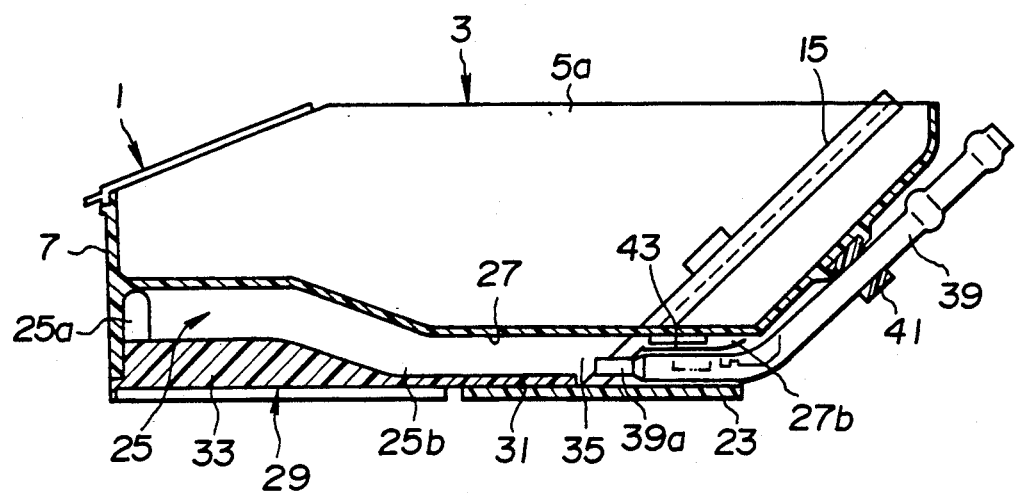
FIG. 4 is a side sectional view of the reservoir arrangement taken in the direction of arrows substantially along a line IV—IV of FIG. 3.

The fuel passage 25 formed generally U-shaped in a plan view includes a going passage 25b which is formed to extend from the opening 27b to the front wall as shown in FIG. 3. A fuel inlet 35 is disposed at a front portion of the opening 27b and connected to the going passage 25b. A turning passage 25a is formed along the front wall 6 and connected to the going passage 25b. A returning passage 25d is formed to extend from the turning passage 25a to the rear wall 9 along the right side wall 5b of the reservoir body 3. A fuel outlet 37 is upwardly opened at an end portion of the returning passage 25d.

The going passage 25b is provided at its front side with a rising portion 25c. The rising portion 25c approaches the right side wall 5a of the reservoir body 3 while increasing its height level toward the front wall 7. The rising portion 25c is gradually decreased in its width dimension while being gradually increased in its height dimension so that a cross-sectional shape of the fuel passage 25 is changed into a vertically elongate rectangle without changing its cross-sectional area.

The turning passage 25a includes curving portions whose each end is connected to each of the going passage 25b and the returning passage 25d while being formed in the same cross-sectional shape as that of the rising portion 25c. The returning passage 25d and the going passage 25b are generally symmetrically formed relative to longitudinal axis (not shown) of the turn reservoir. The returning passage 25d is provided at its front side with a down portion 25e which is gradually increased in its width dimension while being gradually decreased in its height dimension so that a cross-sectional shape of the passage is deformed into an original shape (the cross-sectional shape of the going passage 25b adjacent to the fuel inlet 35). Thus, the front portion of the fuel passage 25 is formed in a vertically elongate rectangle to keep the fuel of the fuel passage 25 at a relatively high position. Furthermore, in order to prevent a vaporization of the fuel from arising by a turbulence at the corner during a condition in which the fuel flows through the fuel passage 25 at a high speed, each of bent portions of the rising portion 25c and the down portion 25e is formed in a curve as large as the curving portions of the turning passage 25a. With this arrangement, the height level of the fuel passage 25 is kept at a relatively high position as compared with the level of the fuel inlet 35.

A fuel return pipe 39 for returning the fuel from an engine (not shown) is connected to the rear wall 9 of the reservoir body 3 through a clip 41. The lower part of the fuel return pipe 39 is directed in the forward direction and inserted into the opening 27b. A tip end portion of the fuel return pipe 39 is disposed to be inserted from the fuel inlet 35 into the going passage 25b. The tip end portion is formed with a nozzle 39a which is narrower than the rest of the return pipe. Accordingly, the nozzle 39a functions as an ejector with which the returning fuel acts as a driving fluid when the fuel is ejected through the nozzle 39a. The opening 27b is communicated with the groove 13 through a mesh 43 for catching foreign substances mixed with fuel.

A fence member 45 is installed on the fuel outlet 37 and provided on its upper surface with a check valve 47. The check valve 47 is opened when the fuel is supplied from the fuel outlet 37 through the fence member 45 into the reservoir 1, and closed to prevent a backward flow of the fuel when the fuel tends to flow backwardly from the turn reservoir 1.

The fuel return pipe 39 is connected at its other end to an end of a flexible fuel return hose 49. The other end of the fuel return hose 49 is connected with a return pipe 53. The fuel pump 101 is connected to an end of a flexible feed hose 51. The other end of the feed hose 51 is connected to a feed pipe 55. Each of other ends of the return pipe 53 and the feed pipe 55 extends to the outside of the fuel tank 201 through the upper plate 207 with which the operating window 205 is closed, as the lead wire 102 of the fuel pump 101 is connected to the outside.

The manner of operation of the thus arranged turn reservoir 1 will be discussed hereinafter.

When the returning fuel from the engine is guided to the fuel return pipe 39, the fuel is powerfully ejected from the fuel return pipe 39 through the fuel inlet 35 into the going passage 25b. Since the tip end portion of the fuel return pipe 39 is formed with the nozzle 39a, the ejecting power is further increased. By virtue of such an ejecting operation, the fuel in the fuel tank 201 flows from the groove 13 and the rearward portion of the opening 27a to the opening 27a, so that the fuel flows into the going passage 25b of the fuel passage 25. Furthermore, the warmed returning fuel is cooled by the sucked fuel by virtue of their mixture. Since the ejecting operation is carried out even if the remaining fuel amount in the fuel tank 201 is relatively small, the fuel guided into the going passage 25b smoothly flows into the returning passage 25d through the turning passage 25a.

The fuel passed through the fuel passage 25 is sent from the fuel outlet 37 through the fence member 45 in the reservoir body 3. Since the chamber plate 29 is formed with a material whose swelling amount by fuel is larger than that of the turn reservoir 1, the periphery of the plate member 31 is sealingly connected with the installation portion 27a, so that the fuel sealing performance is securely kept in the fuel passage 25.

With this arrangement, the fuel sealing performance between the camber plate 29 and installation portion 27a is kept without using adhesive or improving an accuracy of configurations. This largely facilitates an assembly operation.

Figure 6:
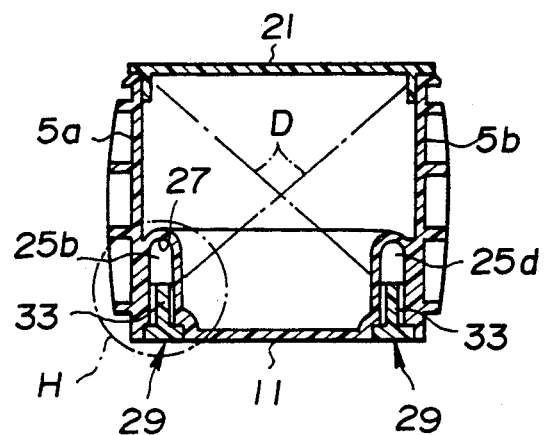
FIG. 6 is a cross sectional view of the reservoir arrangement taken in the direction of arrows substantially along a line VI—VI of FIG. 5.
Figure 7:
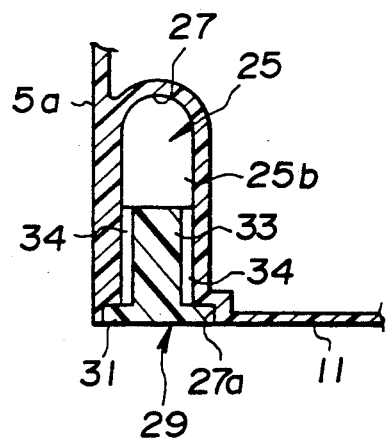
FIG. 7 is an enlarged fragmentary view, as indicated by a circle H of FIG. 6.

Furthermore, since the plurality of protruding ribs 34 are disposed at the engaging portion 33 so that the protruding ribs 34 are increased in swelling amount at its protruding part, the engaging surfaces of the protruding ribs 34 are sealingly connected to the passage surface 27 as shown in FIGS. 6 and 7. Accordingly, the chamber plate 29 is reliably secured to the passage surface 27 so that the sealing performance of the fuel passage 25 is reliably kept.

Figure 5:
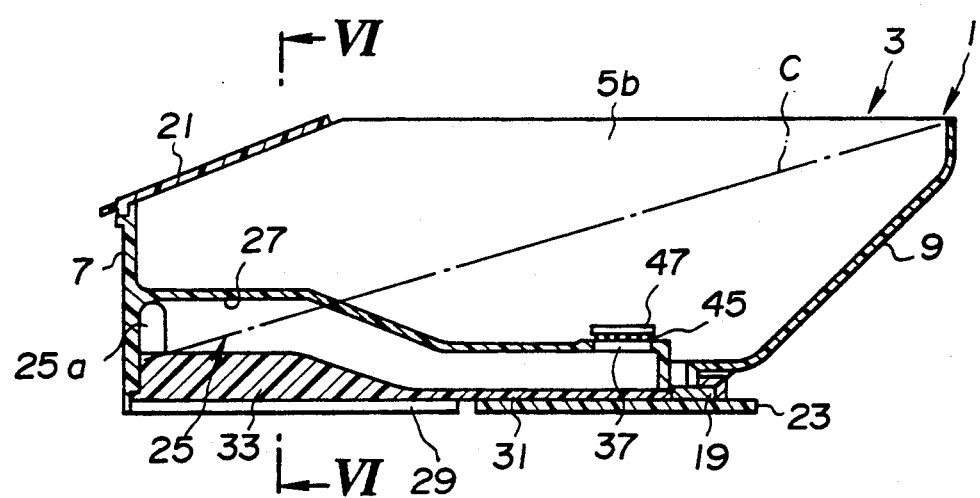
FIG. 5 is a side sectional view of the reservoir arrangement taken in the direction of arrows substantially along a line V—V of FIG. 3.

Since the turning passage 25b is located at a relatively high height level while being kept under a sealing condition, the fuel in the turning reservoir 1 can be stored at the fuel level indicated by a line C in FIG. 5 or a line D in FIG. 6 even if the fuel level is inclined in the fuel tank 201 as the line C or D. Thus, since the plate portion 41 is sealingly connected to the installation portion 27a while the protruding ribs 34 are fittingly connected to the inner surface of the passage surface 27, the fuel in the fuel passage 25 is prevented from leaking from the gap between the plate portion 31 and the installation portion 27 and from backwardly flowing to the side of the fuel inlet 35. Therefore, even if the fuel level is inclined as shown in FIGS. 5 and 6, the fuel level in the fuel passage 25 can be kept at a level of the upper edge of the engaging potion 33, so that the fuel level shown by the line C and the line D can be maintained.

Figure 8:
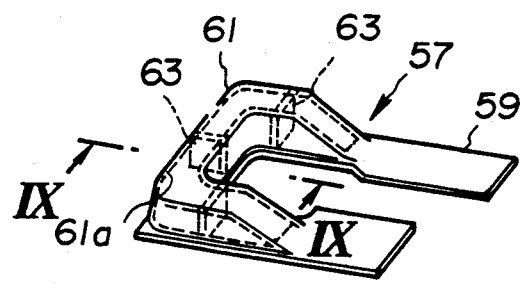
FIG. 8 is a perspective view of a chamber plate according to a second embodiment of the present invention.
Figure 9:
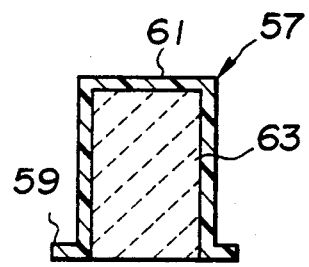
FIG. 9 is a cross sectional view taken in the direction of arrows substantially along a line IX—IX of FIG. 8.

FIGS. 8 and 9 illustrate a second embodiment of the reservoir arrangement R according to the present invention, which is similar to the first embodiment except for a chamber plate 57. The chamber plate 57 is similar to the chamber plate 29 in view of the fact that each of the chamber plates 29 and 57 has a plate portion 59 generally formed in U-shape in a plan view and an engaging portion 61 located at a front section of the plate portion 59. The chamber plate 57 has an engaging portion 61 defining a hollow chamber (no numeral) and is formed in a hat-shape in cross-section. A plurality of closing ribs 63 are disposed in the inner surface of the engaging portion 61 at predetermined intervals. The closing ribs 63 are disposed to close the hollow chamber in the cross-sectional direction as shown in FIG. 9.

Accordingly, by virtue of swelling by fuel, the outer surface of the engaging portion 61 is rigidly and fittingly connected to the passage surface 27 in the vicinity of the closing ribs 63. Therefore, the connection between the engaging portion 61 and the passage surface 27 is further strengthened as compared with that of the first embodiment.

Figure 10:
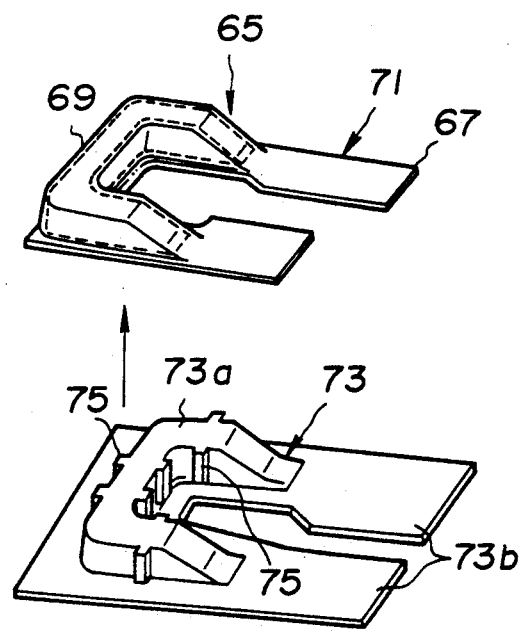
FIG. 10 is a perspective view of a chamber plate according to a third embodiment of the present invention.
Figure 11:
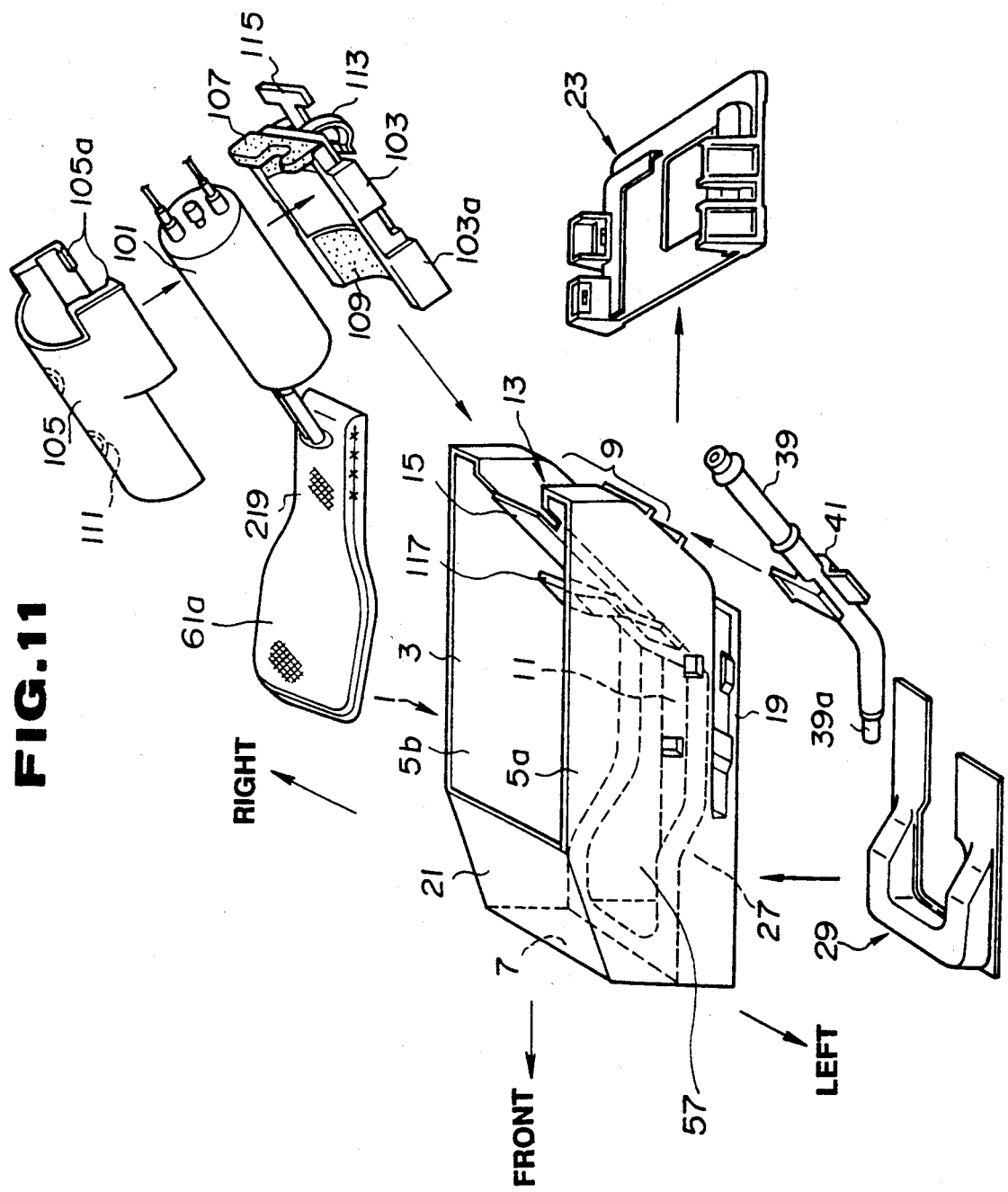
FIG. 11 is a exploded perspective view of a forth embodiment of a reservoir arrangement according to the present invention.

FIG. 10 illustrates a third embodiment of the reservoir arrangement R according to the present invention, which is similar to the first embodiment with the exception that a chamber plate 65 has a double wall structure and includes an outer member 71 and an inner member 73 which are engaged with each other. The outer member 71 is equipped with a generally U-shaped plate portion 67. A hat-shaped engaging portion 69 is located at the front portion of the plate portion 67. The inner member 73 is inserted into an inner portion of the engaging portion 69.

A flange portion 73b of the inner member 73 is of a size larger than the plate portion 67 of the outer member 71. An inner body 73a of the inner member 73 is contiguous and integral with the flange portion 73b. A plurality of protruding ribs 75 are formed on both side surfaces of the inner member body 73a at predetermined intervals.

Accordingly, when the chamber plate 65 is engaged with the passage surface 27 and dipped-in fuel, the outer member 71 is enlarged in size by virtue of the swelling of the inner body 73a, and more particularly by virtue of a swelling of the protruding rib 75. Therefore, the engaging portion 69 is wholly and sealingly connected to the passage surface 27 by virtue of the swelling of the outer member 71. With this arrangement, the connection between the outer member 71 and the passage surface 27 is largely improved at the corresponding part of the protruding rib 75 and its vicinity, so that the third embodiment has an improved sealing performance similar to that of the second embodiment.

Furthermore, since the flange portion 73b is fixedly connected at its periphery to the bottom surface of the reservoir body 3 along the fuel passage 25 by welding while plate portion 67 is engaged with the installation portion 27a, the sealing performance of the fuel passage is further reliably improved.

Figure 15:
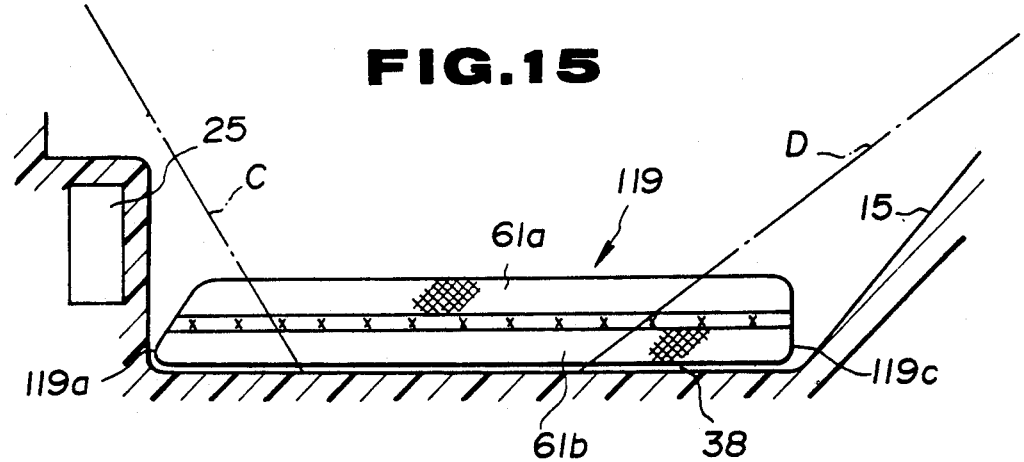
FIG. 15 is a cross sectional view taken in the direction of arrows substantially along a line XV—XV of FIG. 14.

FIGS. 11 to 16 illustrate a forth embodiment of the reservoir arrangement R according to the present invention, which is similar to the first embodiment except for a strainer 219. The strainer 219 is installed to a sucking portion of the fuel pump 101 and formed so that its plan shape generally corresponds to that of the bottom surface 38 of the turn reservoir 1 as shown in FIGS. 12 and 15. The plan view of the strainer 219 is generally similar to the bottom surface 38 indicated by a cross-hatched part of FIG. 14. A front end periphery 119a of the strainer 119 and right and left side peripheries 119b are contacted with or located in the vicinity of the side wall of the fuel passage 25. Therefore, when the periphery of the strainer 219 is contacted with the side wall of the fuel passage, the strainer 219 is fittingly put on a predetermined position.

The strainer 219 is formed so that a grilled frame (not shown) formed with parallel crosses is covered at its opposite faces with mesh sheets 61a, 61b which are installed from the upper and lower directions. The mesh sheets 61a, 61b are welded at the middle portion of the frame.

Figure 16:
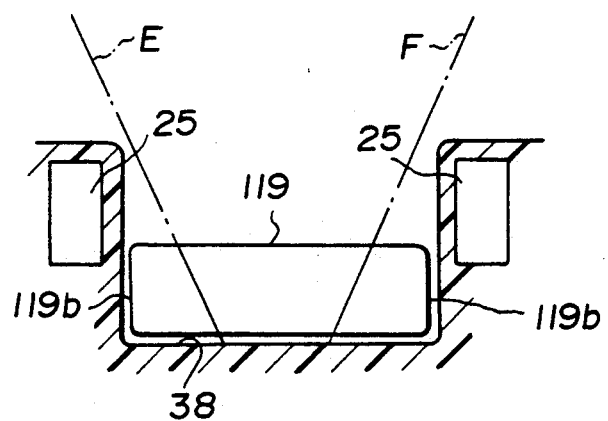
FIG. 16 is another cross sectional view taken in the direction of arrows substantially along a line XVI—XVI of FIG. 14.
Figure 17:
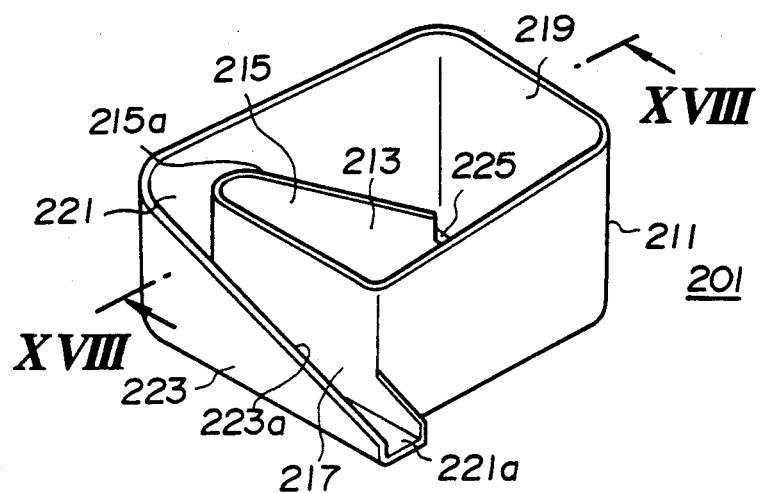
FIG. 17 is a perspective view of a conventional reservoir arrangement.
Figure 18:
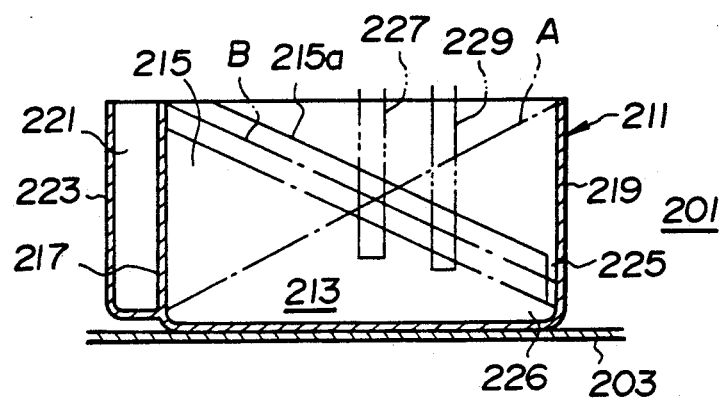
FIG. 18 is a side cross-sectional view of the conventional reservoir arrangement of FIG. 17.

With this arrangement, as the bottom surface 38 of the turn reservoir 1 is covered with the strainer 219, at least a part of the strainer 219 is dipped in the fuel even if the fuel level is inclined as indicated by lines C, D in FIG. 15 or lines E, F in FIG. 16 during the situation where the vehicle in turning or wherein the vehicle is parked on an inclined ground. Accordingly, the fuel pump 101 effectively sucks fuel in the reservoir body 3 even if there is no large amount of fuel in the fuel tank.

Furthermore, the strainer 219 efficiently functions even if it is used in a fuel tank of the type in which a fuel pump is directly supported on the fuel tank.

What is claimed is:

1. A reservoir arrangement for use in an automotive fuel tank, said reservoir arrangement being connected on an inside bottom surface of the fuel tank, said reservoir arrangement comprising:

a reservoir body defining a fuel reservoir in which fuel is collected and from which the fuel is pumped, said reservoir body having an outer bottom surface which includes a depressed surface which is depressed in an upward direction from said fuel tank bottom surface; and a chamber plate engaged with said depressed surface to define a fuel passage through which fuel flows into said fuel reservoir, said chamber plate being located between said depressed surface and said fuel tank bottom surface, and said chamber plate being made of a material whose amount of swelling by fuel is larger than that of said reservoir body.

2. A reservoir arrangement as claimed in claim 1, wherein said chamber plate includes a plate portion whose periphery is engaged with said depressed surface, and an engaging portion whose side surfaces has ribs engageable with said depressed surface.

3. A reservoir arrangement as claimed in claim 1, wherein at least a part of said chamber plate is formed U-shaped in cross-section and has an outer surface engaged with said depressed surface said chamber plate including a rib which is formed inside and fitted with said U-shaped part.

4. A reservoir arrangement as claimed in claim 1, wherein said chamber plate includes an outer member engaged with said depressed surface and an inner member engaged with an inner surface of said outer member, said inner member including a rib through which said inner member is engaged with said outer member inner surface.

5. A reservoir arrangement as claimed in claim 1, wherein said reservoir body has an inner bottom surface including an inner projecting surface, said inner projecting surface being integral with said depressed surface.

6. A reservoir arrangement as claims in claim 5, further comprising a strainer disposed in said reservoir body, said strainer being formed in a shape generally similar to said inner bottom surface except for said inner projecting surface, wherein said strainer is placed on said inner bottom surface of said reservoir body, and fuel in said reservoir body being pumped through said strainer.

7. A reservoir arrangement as claimed in claim 1, wherein said chamber plate is made of nylon-12 when said reservoir body is made of nylon-6,6.

8. A reservoir arrangement as claimed in claim 1, wherein said fuel passage has a fuel inlet through which fuel is guided into said fuel passage and a fuel outlet through which fuel is sent from said fuel passage into said reservoir.

9. A reservoir arrangement as claimed in claim 8, wherein a portion of said fuel passage is higher in height level than its inlet and outlet.

10. A reservoir arrangement as claimed in claim 6, wherein said strainer is formed with a parallel cross shaped frame and a mesh member.

11. A reservoir arrangement as claimed in claim 1, wherein fuel passage is defined by said passage surfaces formed with smoothly curved corner.

* * * * *